May 21, 1968  L. C. CHOUINGS  3,384,205

INTERNAL SHOE DRUM BRAKES

Filed July 18, 1966  2 Sheets-Sheet 1

INVENTOR
Leslie C. Chouings
BY Lawrence J. Winter
ATTORNEY

United States Patent Office 3,384,205
Patented May 21, 1968

3,384,205
INTERNAL SHOE DRUM BRAKES
Leslie C. Chouings, Leamington Spa, England, assignor to Automotive Products Company Limited, Warwickshire, England
Filed July 18, 1966, Ser. No. 566,104
2 Claims. (Cl. 188—78)

ABSTRACT OF THE DISCLOSURE

This invention relates to an internal shoe brake drum with opposed primary and secondary brake shoes connected at their opposite ends, and with a cylinder at one of their ends provided with opposed pistons for spreading apart the brake shoes at this end. One piston is provided with a slot and has a pin disposed in it to move back and forth in the slot. The pin is connected to a lever pivotally connected to the brake back plate and is spring loaded at its opposite end to normally urge the secondary brake shoe away from the primary shoe. The slot and pin arrangement provides a yieldable abutment. Stop means are provided on the piston connected to the primary brake shoe.

---

This invention relates to internal shoe drum brakes having a primary and a secondary brake shoe supported by a brake back plate, the shoes being interconnected at one end thereof by shoe spreading mechanism consisting of a hydraulic wheel cylinder having opposed pistons and interconnected at their ends diametrically opposite to the hydraulic wheel cylinder by thrust means which may if desired, incorporate means for effecting brake shoe adjustment to compensate for wear in the brake shoes.

The invention has for its object to provide in a drum brake of the kind above referred to, means for limiting the brake torque so that when a predetermined brake torque is reached there is only a negligible increase even though the brake actuating force may increase.

According to the invention, in an internal shoe drum brake of the kind above referred to the end of the secondary brake shoe associated with the hydraulic wheel cylinder of the shoe spreading mechanism is also associated with a yieldable abutment which will yield when a predetermined brake torque is reached. The yieldable abutment permits circumferential displacement of both the primary and secondary shoes such displacement being limited by stop means further increase in the brake actuating force then resulting in an increase in the braking with a trailing shoe effect.

The yieldable abutment is for example provided by a piston of the hydraulic wheel cylinder which piston is associated with the secondary shoe, the said piston being spring loaded the spring action urging the piston outwardly of the hydraulic wheel cylinder. The stop means for limiting the circumferential displacement of the brake shoes is for example provided by a pair of stops, a fixed stop provided in the hydraulic wheel cylinder and a stop provided on a piston of the wheel cylinder which piston is associated with the primary brake shoe.

A drum brake according to one embodiment of the invention will now be described by way of example with the aid of the accompanying drawings in which.

Figure 1:
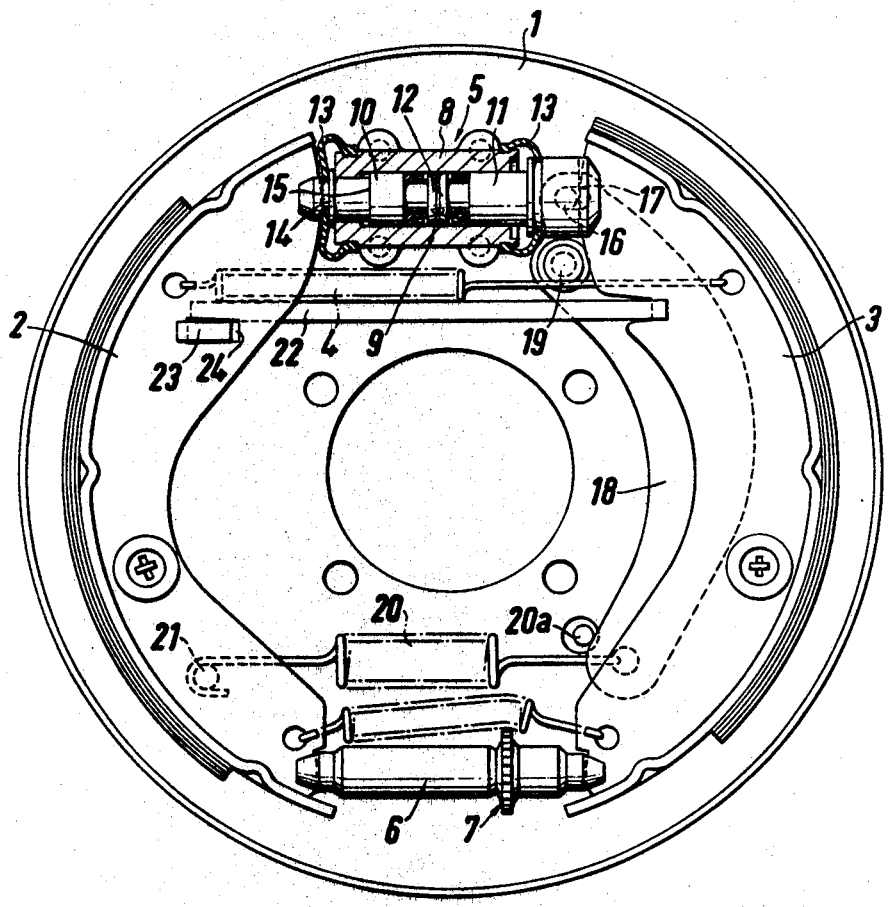
FIGURE 1 is a view of the drum brake with the brake drum removed, the brake acting as a duo-servo before the torque limit is reached.
Figure 2:
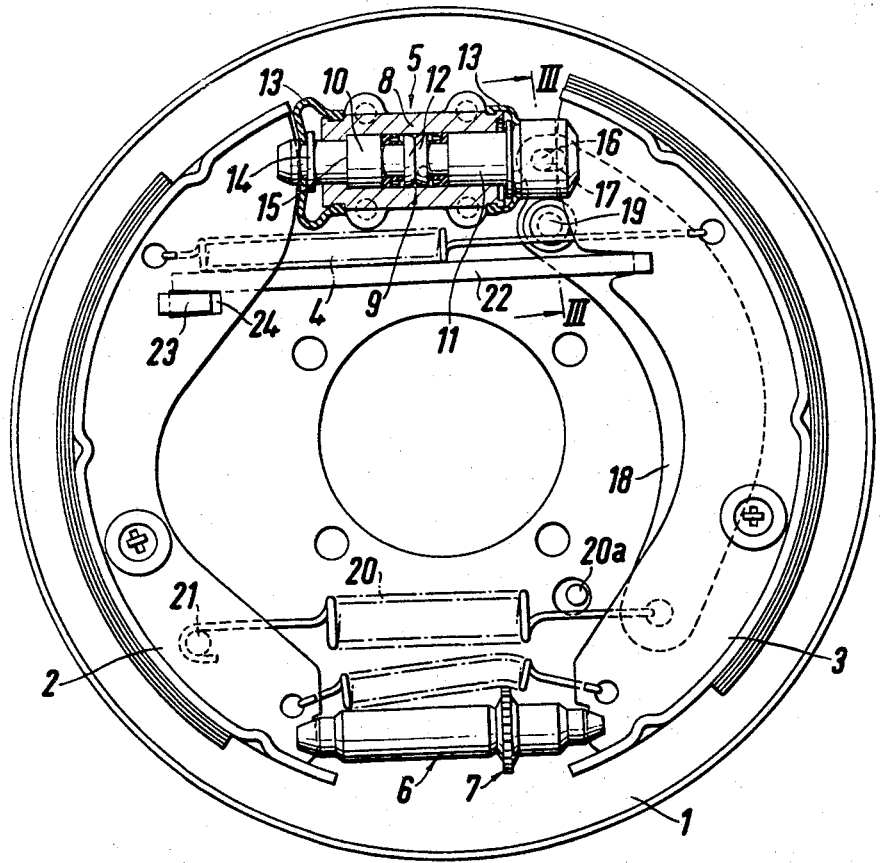
FIGURE 2 is a view similar to FIGURE 1 but showing the brake after the torque limit has been reached.
Figure 3:
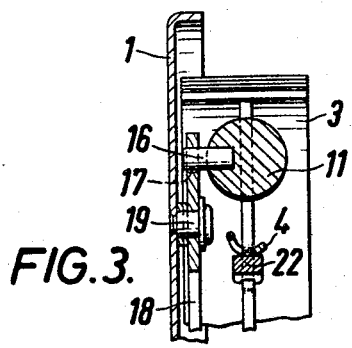
FIGURE 3 is a fragmentary view on the line III—III in FIGURE 2.

Referring to the drawings the internal shoe drum brake comprises a brake back plate 1 supporting a pair of arcuate brake shoes 2, 3 respectively of conventional form, the shoes being urged towards one another to the brake off position by pull off springs 4. Separation of the brake shoes to effect braking is effected hydraulically by admission of pressure fluid, for example hydraulic liquid, to a wheel cylinder indicated generally by reference numeral 5, which is positioned in the usual manner between one pair of adjacent ends of the brake shoes 2, 3, the other adjacent pair of shoe ends being interconnected by thrust means indicated generally by reference numeral 6 which advantageously and in conventional manner incorporates means indicated generally by reference numeral 7, for adjusting the brake shoes to compensate for wear in the brake shoe linings.

The wheel cylinder is double ended and consists of a cylinder body 8 secured to the brake back plate, the cylinder body having a through bore 9 containing a pair of opposed pistons 10, 11 respectively, arranged end to end. The outer ends of the pistons project out of the cylinder bore, each said end having in conventional manner a diametral slot to receive the adjacent end of the web of the appropriate brake shoe. The inner end of each piston is chamfered as shown at 12 to provide an annular space of V section for the inlet of pressure fluid between the pistons. A sealing boot 13 is provided at each end of the wheel cylinder to prevent the deposit of dirt and moisture on the projecting end of each piston and the ingress of dirt and moisture to the cylinder bore. The inward movement of the piston 10 associated with the primary shoe 2 is limited by engagement of an annular shoulder 14 provided around the outer projecting end of this piston with the appropriate end of the cylinder body, the outward movement of this piston being limited by engagement of a further annular shoulder 15 on the portion of the piston 10 within the cylinder body with the inner surface of the cylinder body end.

The outer projecting end of the piston 11 associated with the secondary brake shoe 3 has a radially extending pin 16 which engages in a slot 17 in one end of an arcuate lever 18 which extends circumferentially with the secondary brake shoe, the lever being disposed between the web of this brake shoe and the brake back plate 1. The slot 17 in the lever 18 extends parallel to the axis of the cylinder body bore 9 and the lever is pivotally mounted on the back plate on a pivotal mounting 19 adjacent the slot 17 and offset inwardly thereof. The end of the lever remote from the pivotal end is connected to one end of a tension spring 20 which extends in a chordal direction of the brake back plate 1 the other end of the spring being anchored to the brake back plate as shown at 21. This end of the lever co-operates with a fixed stop 20a carried by the brake back plate so that the spring can be preloaded as required. The spring 20, acting through the arcuate lever 18 thus tends to urge the piston 11 associated with the secondary shoe 3 outwardly of the wheel cylinder body so that the same provides a yieldable abutment for this shoe which yields at a predetermined load.

During normal forward movement of a vehicle having a brake as above described, upon the admission of pressure fluid to the wheel cylinder and between the inner ends of the pistons, the pistons 10, 11 move outwardly to separate the primary and secondary shoes to effect braking, the brake acting under normal conditions with a duo-servo action. The drag force created by engagement of the secondary shoe 3 with the brake drum, acts on the piston 11 associated with this shoe so that when the load of the spring 20 acting on the pivoted arcuate lever 18 is overcome, the lever will pivot in the anticlockwise direction (FIGURE 1) thus permitting the piston 11 to yield whereby the same moves inwardly in the cylinder bore 9. The inward movement of this piston permits both brake shoes to move circumferentially in the direction of rotation of the brake drum. As a result of the inward movement of the piston 11 associated with the secondary shoe 3, the piston 10 associated with the primary shoe 2 moves outwardly until the inner annular shoulder 15 on this piston engages with the inner surface of the end of the wheel cylinder. When this condition is attained further increase in the brake actuating force will result only in outward movement of the piston 11 associated with the secondary brake shoe 3 so that braking will increase with a trailing shoe action.

When the vehicle is moving in reverse if the brakes are applied, circumferential displacement of the primary shoe 2 will occur. This displacement will cause the piston 10 associated with this shoe to move inwardly in the wheel cylinder this inward movement being interrupted when the annular shoulder 14 around the outer projecting end of this piston contacts the adjacent outer end of the wheel cylinder. Braking is therefore effected by the piston 11 associated with the secondary shoe 3 this piston being free to move relative to the arcuate lever 18 due to the pin and slot connection therebetween.

The brake of the present invention can be adapted for mechanical operation in addition to the operation by fluid pressure the mechanical operation permitting the brake to be actuated by the hand brake of a vehicle. Any suitable form of mechanism can be incorporated in the brake for this purpose, the mechanism being arranged so that the same is unaffected by the brake shoe displacement arising when the brake is applied normally, the brake when actuated mechanically operating with duo-servo action. In the brake shown in the drawings, mechanical operation of the brake shoes is effected through a linkage comprising a first link 22 which is mounted so as to be movable lengthwise in a chordal plane of the brake back plate. One end of the link bears against the inner edge of the web of brake shoe 3 the opposite end being pivotally connected to a second link 23 which extends through the back plate. The link 23 is pivotally mounted so as to be swingable in a plane normal to the brake back plate. One end of the link 23 passes through a slot 24 in the web of brake shoe 2 the opposite end, which projects through the brake back plate 1, being connectable to the hand brake lever. As the hand brake lever is operated to apply the brake, link 23 pivots and link 22 moves lengthwise, to the right in FIGURE 1, the joint movement of the links resulting in spreading of the brake shoes.

I claim:
1. An internal shoe drum brake comprising a pair of brake shoes including a primary and a secondary shoe adapted to engage a brakedrum, a backing plate, to which said shoes are secured, a hydraulic wheel cylinder adjacent one end of said shoes with oposed pistons therein movable in opposite directions to spread said shoes apart when hydraulic liquid is supplied to said cylinder, one of said pistons being connected to the primary shoe and the other piston to the secondary shoe, a lever extending circumferentially with said secondary shoe and pivotally connected to said backing plate to be swingable in a plane parallel to the plane of the backing plate, yieldable abutment means connecting said lever to said other piston, spring means connected to said lever to turn the lever in a direction to normally urge said other piston in a direction away from said one piston, and said one piston having a stop thereon and said cylinder having a stop interiorly thereof to limit circumferential displacement of the brake shoes.

2. The drum brake of claim 1 wherein said yieldable elongated slot in said other piston in which said pin elongated slot in said other piston in which said pin is slidably disposed.

References Cited
UNITED STATES PATENTS

| | | | |
|---|---|---|---|
| 2,251,854 | 8/1941 | Parnell et al. | 188—152 X |
| 2,329,095 | 9/1943 | White | 188—152 |
| 2,382,268 | 8/1945 | Stelzer | 188—152 |
| 3,047,099 | 7/1962 | Dahle | 188—78 |
| 3,128,846 | 4/1964 | Stelzer | 188—78 |

DUANE A. REGER, *Primary Examiner.*